RELAY COUNTER FOR DIGRAPHS, TRIGRAPHS, AND THE LIKE

Filed Dec. 21, 1951 2 Sheets-Sheet 1

INVENTOR
HENRY L. THOLSTRUP

BY Robert S. Dunham

ATTORNEY

INVENTOR
HENRY L. THOLSTRUP
BY Robert S. Dunham
ATTORNEY

Patented Sept. 21, 1954

2,689,686

UNITED STATES PATENT OFFICE 2,689,686

RELAY COUNTER FOR DIGRAPHS, TRIGRAPHS, AND THE LIKE

Henry L. Tholstrup, Rochester, N. Y., assignor to International Business Machines Corporation, New York, N. Y., a corporation of New York Application December 21, 1951, Serial No. 262,792

7 Claims. (Cl. 235—92)

The present invention relates to a relay system which is designed to detect a predetermined sequence of pulse occurrences over a number of separate electrical circuits.

It is an object of this invention to provide means for securing data useful in making analytical studies of text material. Such studies are invaluable for example in the development of new shorthand systems. In connection with such particular use it might be beneficial to make up a shorthand for some specific field, such as engineering, medicine, law reporting, or the like. It is necessary to design such systems for most efficient performance in use to determine the number of times given words, phrases or letter combinations occur in the literature of these fields. By using this invention exact counts of such occurrences may be had without resort to time-consuming and tedious manual counting.

According to the present invention, a given text is coded into a tape under control of an electric typewriter or the like, and then this tape is passed through a tape reader to which the counter circuits of this invention are connected, and from which they are controlled. An automatic count is thereby obtained of the occurrence of any single character as well as any specific sequence of characters beginning with such single character.

It will become obvious that by using a plurality of circuits such as those disclosed herein, a simultaneous count may be obtained of any desired words or other specific reference of characters in a text which has been punched into a tape of the type disclosed. Such counts of the number of occurrences of certain words or phrases is necessary in setting up an efficient shorthand for any particular field.

Obviously, this invention would also be useful in the reverse process, so to speak, from that set forth above concerning shorthand. That is, this invention may be used in decoding a given text because in such process knowledge of the occurrences of given characters in a definite sequence would again be valuable.

In order to more clearly understand this invention, it is set forth in a specific use in connection with a tape reading mechanism such as that disclosed in my Patent No. 2,378,371, issued June 12, 1945. The tape reading mechanism illustrated herein is a simplified schematic of the tape reading system disclosed in the aforementioned patent. Although the gist of the present invention is embodied in a system of relays combined with counters or other indicating means, in order to understand its nature, it is shown being used in connection with a tape reading mechanism. The tape reading mechanism shown will be described first to afford a background for understanding of the relay circuit of this invention.

Figure 1:
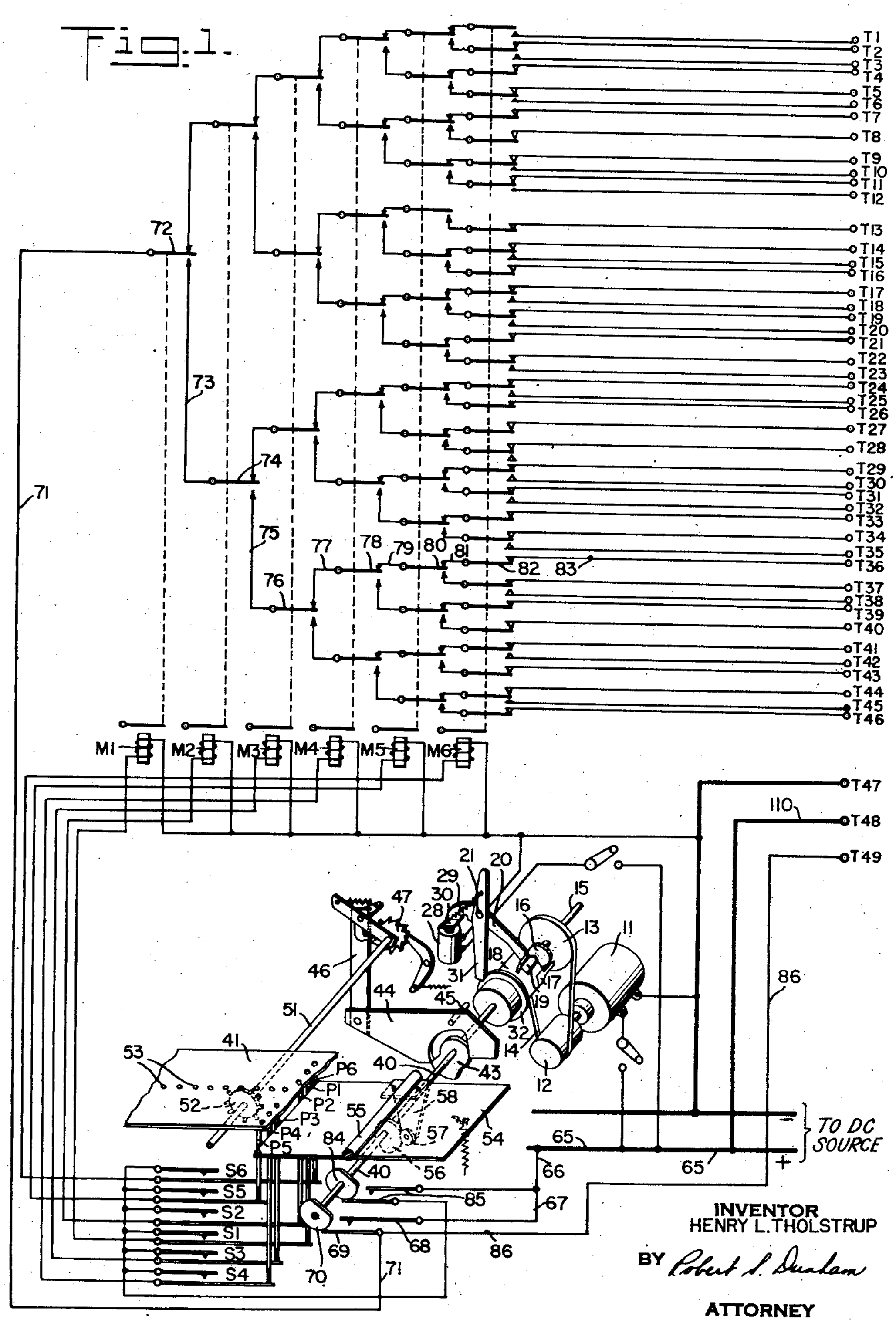
Fig. 1 is a diagram of a tape reading device and its associated electric circuit.

In Fig. 1 a tape reading mechanism is shown which comprises an electric motor 11 for driving the mechanism. This motor is operatively connected to the tape reading mechanism by means of pulleys 12 and 13, and a belt 14. Whenever the motor is energized, it will continuously drive a shaft 15. The shaft 15 carries a toothed wheel 16 at the end thereof for use in clutching the reader mechanism to the drive shaft 15.

Any convenient clutch may be employed. However, it is preferred to use a clutch like that disclosed in the United States Patent No. 2,206,646, issued to K. R. Schneider on July 2, 1940. A simplified showing of this clutch is here disclosed and consists of the continuously driven toothed wheel 16, previously mentioned, and a pawl 17 which is carried by a clutch barrel 18. There is a radially disposed slot in which the pawl 17 may slide, and there is a spring (not shown) which urges the pawl 17 radially inwardly to cause it to engage the toothed wheel 16. A pivoted element 19 is also disposed in the clutch barrel 18, and is located approximately at right angles to the pawl 17, so that when the element 19 is moved clockwise, as viewed in Fig. 1, it will cause the pawl 17 to be moved radially outward and disengage the clutch. A pivoted arm 20 is carried by the framework of the machine (not shown) which can be rocked about a pivot 21 by means of a solenoid 28. When the solenoid 28 is energized, the arm 20 will be rotated counterclockwise as viewed in Fig. 1, and the end of the arm will be thereby raised sufficiently to clear the pivoted element 19 so that the clutch will remain engaged.

In order to disengage the clutch mechanism, when the solenoid 28 is deenergized, the pivot arm 20 is lowered into the path of the pivoted element 19 by means of force derived from a spring 29 which is attached to the pivot arm 20 at the end where the arm is attached to an armature 30 of the solenoid magnet 28. The other end of spring 29 is attached to an arm 31 which is pivoted at the pivot 21 with arm 20. The arm 31 rests against a flange 32 of the clutch barrel 18 in order that it may act as a detent for the home or starting position of the mechanism. Also, the action of the arm 31 in acting as a detent keeps the clutch barrel 18 from sliding back and consequently allowing the clutch to reengage.

The clutch barrel 18 is attached to the end of a shaft 40 which is the main driving shaft for the tape reading mechanism. In order to cause a tape 41 to be stepped from one reading position to the next, there is a ratchet mechanism and a wheel carrying short, radially extending spokes for engaging a series of feed holes in the tape. This ratchet mechanism consists of a cam 43 securely attached to the shaft 40 which cooperates with a cam follower plate 44. The plate 44 is pivotally attached to the framework (not shown) as indicated by a pin 45. The cam 43 and its follower 44 are appropriately designed to cause an arm 46 to be pulled downward and returned once during each revolution of the shaft 40. Such downward motion of the arm 46 causes a ratchet wheel 47 to be carried around one step by means of appropriate pawls as illustrated. The ratchet wheel 47 is carried on the end of a shaft 51 which also carries a stepping wheel 52 for engagement with feed holes 53 in the tape 41. It will be appreciated that the mechanism just described is for the purpose of advancing, from one reading position to the next and in step-by-step progression, a tape 41 into which the text to be analyzed has been punched in the form of combinational holes extending across the tape. The tape is advanced one reading position for each reading cycle, i. e. each revolution of the drive shaft 40.

It is desired that the tape be read during each reading cycle. In order to do this, pins P1 through P6 will be allowed to make contact with the tape and thereby determine the location of character representing holes that have been punched into the tape. The pins P1 through P6 are spring-biased upward, but are restrained from free upward movement by a bail 54. The bail 54 engages notches in each of the pins, such that during each cycle, while the tape 41 is being moved to a position for reading, the pins P1 through P6 are held down out of engagement with the tape. Then bail 54 is rotated clockwise as viewed in Fig. 1 about a bail shaft 55. This action is controlled by means of a cam 56 and a follower 57 which is carried on a cam follower arm 58. The arm 58 is attached to the bail 54 in order to impart rotary motion to the bail as determined by the cam 56.

When the tape 41 is in position for reading, the bail 54 is rotated to allow the pins P1 through P6 to rise up and contact the under surface of the tape. Wherever there are holes punched in the tape, those pins will rise to the limit of their travel and consequently will actuate their corresponding switches as will presently be described. Those pins which do not encounter holes in the tape will be restrained by the tape from rising any further and consequently will not close their corresponding switches.

A series of switches S1 through S6 are controlled by the pins P1 through P6, such that when the tape is being read, if any of the pins encounter corresponding holes in the tape, such pins will be allowed to rise sufficiently to close its corresponding switch. In this regard it will be noted that the movable arms of the switches are spring-biased toward the reading position of the pins. Thus it will be appreciated that when the tape is being read (by means of the bail 54 being rotated clockwise to allow the pins to engage the tape), a combination of switches S1 through S6 will be closed corresponding to the tape holes through which the reading pins pass.

Switches S1 through S6 are connected in a controlling manner to magnets M1 through M6, which are the operating magnets for a series of multiple contact relays. Each of these relays controls all the contacts located vertically above its magnet as is schematically indicated by the dotted line in the drawing. The switches in each case are one or more single pole double throw switches which are spring-biased to the upper contact position as illustrated, and will be operated to the lower contact position whenever a related magnet coil is energized. By means of the circuit shown in Fig. 1, actuation of a given combination of magnets M1 through M6 will cause any one of the circuits terminating at terminals T1 through T46 to be energized.

To illustrate the selection of a given circuit, we may choose the circuit representing the letter "A". This circuit will be carried from the positive line wire 65 (Fig. 1) to wires 66, 67 and contact 68, where energizing of the selected circuit takes place. When contact 68 is allowed to complete its circuit to contact 69 by means of a cam 70, a circuit is completed from contact 69 to wire 71, and a common contactor 72 of relay M1. Now since the code combination representing letter "A" is composed of holes in the tape at positions 1 and 2 (see Fig. 3) relay magnets M1 and M2 will each be energized through contacts S1 and S2, respectively, so that their contacts will be actuated to their lower position. Therefore, the circuit being completed may be carried from common contactor 72 through its lower contact to wire 73 and common contactor 74 of relay M2, then through the lower contact cooperating with common contactor 74 to wire 75 and thence to common contactor 76. Now since none of the remaining relays M3 through M6 are energized, the circuit may be followed to wire 77, common contactor 78, wire 79, common contactor 80, wire 81, common contactor 82, and finally wire 83 to terminal T36. When a circuit is selected in this manner, it may be utilized to operate an electric typewriter in the manner disclosed in the aforementioned Patent No. 2,378,371, issued June 12, 1945 and may simultaneously be utilized by a relay circuit of this invention as will presently be described. Cam 70 will be so shaped that the pulse created by closing of contacts 68 and 69, as just described, will have an appropriate duration such that the desired functions may be accomplished, but always terminating before the completion of each revolution of the shaft 40 by a return of these contacts 68 and 69 to the open position as illustrated.

Figure 3:
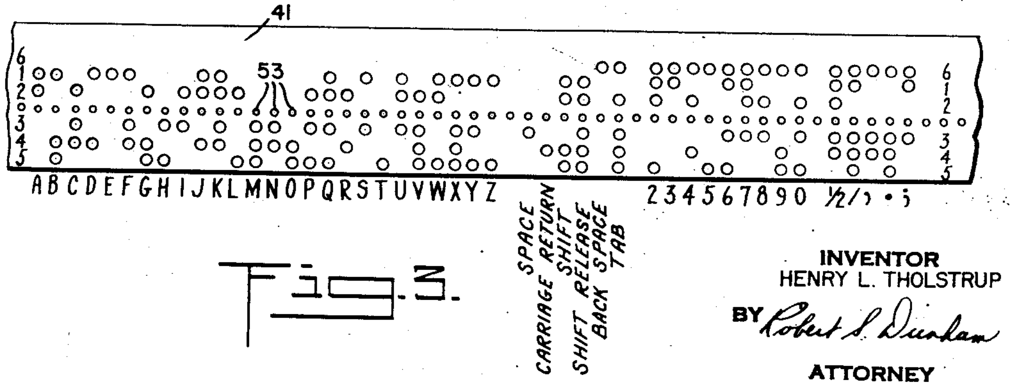
Fig. 3 is a representation of a sample strip of tape showing the characters and functions represented by various combination of holes in such a tape.

In Fig. 3 a sample strip of tape is illustrated which shows the specific code combination of holes with their location for each character or function to be performed. This figure also more clearly shows the small tape feed holes 53 near the center of the tape which are engaged by the feed teeth of the stepping wheel 52 to advance the tape through the tape reader.

In order to correlate and clarify this disclosure, operation of the reading mechanism will be briefly reviewed. Beginning with the home or starting position shown, each complete revolution of the shaft 40 completes one cycle during which a circuit representing a character, or a function to be performed, is energized under tape control. First the cam 43 will cause the ratchet wheel 47 to be rotated a step which turns the stepping wheel 52 with it. This moves the tape along to the next position for reading. Then the cam 56 will cause the bail 54 to rock and release all the pins P1 through P6 for contact with the tape 41. At this time all those pins which encounter holes in the tape will rise to the limit of their upward travel to close their respective switches S1 through S6. Next, the cam 84 will close switch contacts 85 which completes a circuit (clearly shown) for each of the magnets M1 through M6 whose switch S1 through S6 is closed. Then the cams 56 will cause the bail 54 to rock and release all the pins P1 through P6 for contact with the tape 41. At this time all those pins which encounter holes in the tape will rise to the limit of their upward travel to close their respective switches S1 through S6. Next, the cam 84 will close switch contacts 85 which completes a circuit (clearly shown) for each of the magnets M1 through M6 whose switch S1 through S6 is closed. Then shortly after the actuation of the selected relay magnets M1 through M6, the cam 70 will allow the contacts 68 and 69 to close which energizes the selected circuit as previously described. It may be noted at this point that there is an auxiliary circuit energized by the closing of the contacts 68 and 69. This auxiliary circuit is that of one winding of a differential relay which is connected to wire 86 and terminal T49. The purpose of this auxiliary circuit will be explained later.

The energization of a specific circuit which represents a character to be typed or counted, or a function to be performed will be referred to as a pulse since there is in effect a definite time duration or pulse of energy transmitted over the selected circuit. Therefore, there will be a pulse representing a selected character and a simultaneous pulse over the auxiliary circuit, once each cycle, i. e. each revolution of shaft 40.

Figure 2:
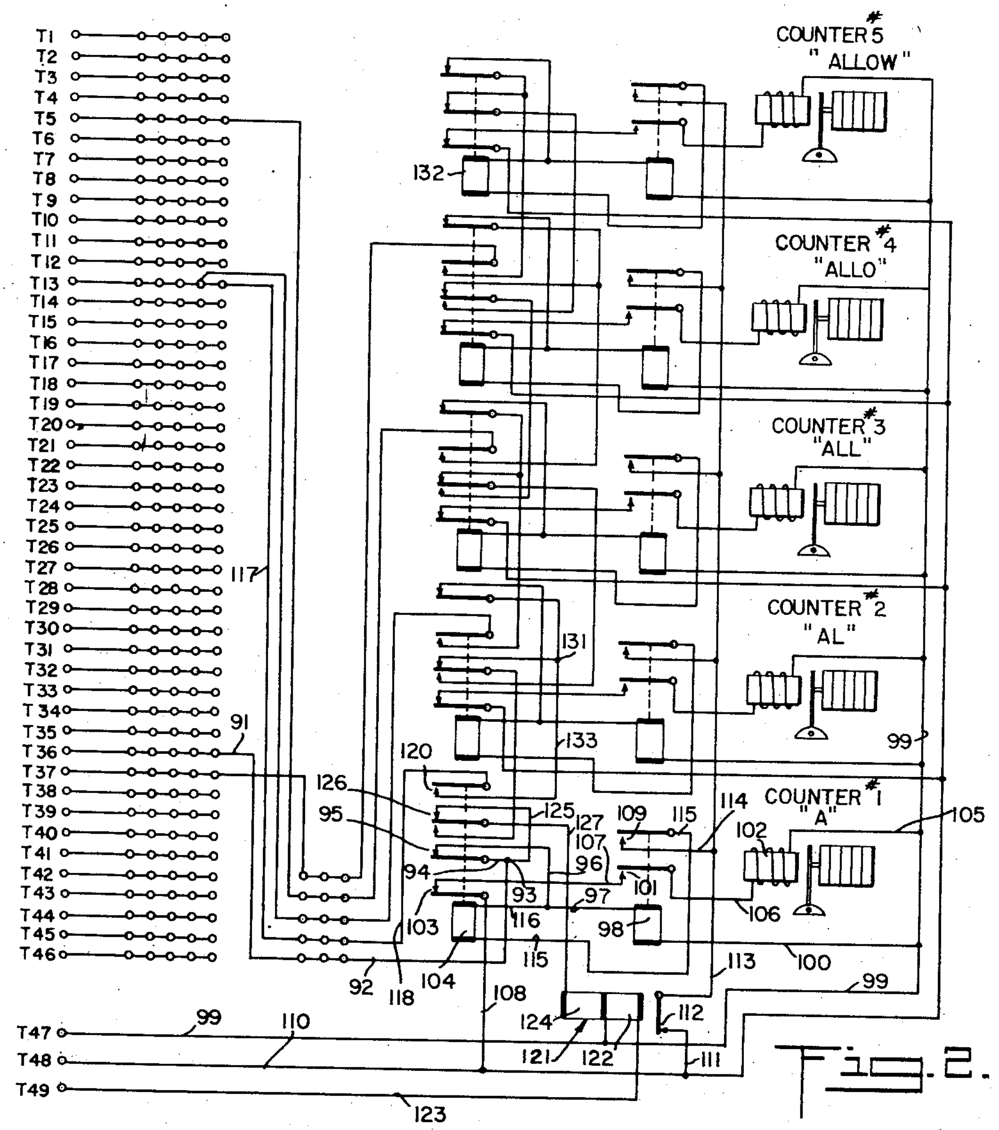
Fig. 2 is an electric circuit diagram of a relay counter system of this invention.

The relay system of this invention illustrated in Fig. 2 is a set up in conjunction with counters or other indicating means such that occurrence of a given specific combination of pulses representing various characters will be indicated by the counters. In other words, when pulses representing a predetermined combination of characters are transmitted, one of the counters will be actuated and so indicate this fact. It will be obvious that some of the counters used might be omitted if desired or additional ones may be provided, since each counter will indicate an occurrence of its specific character or group of characters depending upon the way in which the counter is connected into the translating network. In order to illustrate a specific embodiment of the invention, the system is shown such that counters 1 through 5 will count the occurrences of each of five separate specific combinations of characters.

To explain the way in which this is accomplished, it may be appropriate to follow the circuits used for determining occurrences of the following characters: "A," "AL," "ALL," "ALLO," "ALLOW." All of the relays in Fig. 2 are shown in their deactivated state, i. e. not energized. The contacts are spring-biased upward as in the showing of the selector magnet relays M1 through M6, and the contacts which the actuated by each relay solenoid are located directly above the same, and are indicated as being actuated by their solenoid by the dotted lines shown. First, assuming a pulse representing the letter "A" is received at terminal T36, it will be carried over wires 91 and 92 to a common connection 93. From here the pulse will be carried by wire 94, contacts 95, which are now closed, wire 96 and wire 97, to relay winding 98. The other side of relay winding 98 is connected directly to the negative supply line 99 by means of wire 100. Relay 98 will then be actuated, closing its contacts 101, which close a circuit for energizing solenoid 102 of counter 1. This circuit is completed over contacts 103 of relay 104 as may be seen. The circuit may be followed beginning at the negative supply line 99, over wire 105 to solenoid 102, then from the other side of the solenoid over wire 106, contacts 101, wire 107, contacts 103, and wire 108 to the positive supply line 110. Counter No. 1 therefore will be actuated to give an indication of an occurrence of the letter "A."

When relay 98 is operated, a holding circuit is completed by means of its contacts 109 which may be traced as follows: from the positive supply line 110 to wire 111, contacts 112 to wire 113, wire 114, contacts 109, wire 115, winding of relay 104, wire 116, wire 97, to the winding of relay 98 itself, and wire 100 to negative supply line 99. It will be noted that this holding circuit includes windings of relay 104 and relay 98 in series. The circuit constants are so designed that these relays will remain operated under such reduced voltage as will be caused by this series connection. It is pointed out that this holding circuit does not come into effective operation while the pulse representing the letter "A" is still flowing over the circuit which energized relay 98 as traced above. This follows since the pulse is caused by the same voltage found at the positive supply line 110.

To continue tracing the action of these relay circuits, it will be noted that upon cessation of the pulse representing letter "A" relay 104 will be actuated. In order to understand this, it is necessary to point out that one side of the winding of relay 104 is now connected to the positive supply line 110 by means of closed contacts 109 on relay 98 (the holding circuit). At this time, however, the other side of the relay winding 104 is connected to the same supply source by means of the pulse circuit traced in connection with the letter "A." Therefore, when the pulse circuit is opened by the cessation of the pulse representative of the letter "A," one side only of relay 104 remains connected to the positive supply while the other side is now connected to one side of relay 98, the other side of which is connected to the negative supply 99 as previously explained. These relays are designed to operate when connected in series, so relay 104 will be actuated at this time.

When relay 104 is actuated, it will open the letter "A" circuit as introduced via wires 91 and 92, by opening contacts 95 and it will close the circuit representing the letter "L" as introduced via wires 117 and 118 by closing contacts 120. This means that whereas to begin with only the letter "A" circuit was closed to receive a pulse and actuate its counter (number 1), after the "A" pulse has ceased, the first letter "L" circuit is closed ready to receive a letter "L" pulse and actuate the first letter "L" counter (number 2).

In connection with the holding circuit traced for relays 98 and 104, it is to be noted that contacts 112 are included in this circuit. Contacts 112 are controlled by a differential relay 121. The purpose of this relay is to clear the circuits whenever a pulse is sent which is not one of those representing the specific sequence of characters for which the system is wired. In order to understand the operation of differential relay 121, we must note that a common pulse is sent concurrently with each circuit pulse representing a given character, as was previously pointed out in connection with the tape reading circuits of Fig. 1. This common pulse is introduced to the right-hand winding 122 of differential relay 121 by means of wire 123 which is connected to terminal T49. Left-hand winding 124 of differential relay 121 is energized by the character representing pulse which is being received into the relay system. Therefore, when the relay system receives its character representing pulse, there will be two pulses of equal duration applied to the windings of differential 121. Since these windings are wound in opposite directions, no effect will be felt by the relay armature and the contacts 112 will remain closed. By way of concrete example, let us follow the previously traced pulse representing the letter "A." This pulse is introduced to common connection 93 as previously described and at this point it divides. In this instance, we will follow the pulse from the common connection 93 to wire 125 and upper contact 126, then, since relay 104 is still not energized, the circuit continues over wire 127 to the left-hand winding 124 of differential relay 121. Of course, the simultaneous pulse which accompanies the pulse of any character is being introduced to the right-hand winding 122 of the differential relay 121 so that it remains deenergized.

It is now pointed out that after relay 104 operates, its incoming circuit from terminal T36, which represents letter "A" will be opened and will remain open so long as the holding circuit for this relay (and relay 98) is maintained. At the same time the incoming circuit from terminal T13 which represents the letter "L" will be closed at contacts 120. Therefore, if the next character after the letter "A" is the letter "L", its pulse will be carried up to a corresponding common connection 131 via wires 117, 118, contacts 120 and wire 133. Common contact 131 corresponds to common contact 93 of the circuits associated with counter No. 1, and since the circuits associated with each of the counters are substantially identical (with the exception of counter No. 5), the action is the same for each succeeding pulse so long as the pulses are those for which the system is wired up, e. g. in this case, so long as the second pulse is a letter "L" pulse, the third is a letter "L" pulse again, the fourth is a letter "O" pulse and the fifth is a letter "W" pulse.

The only difference in the circuits associated with counter No. 5 is that there is no double-throw contact used with relay 132. The reason is merely that in this instance counter No. 5 is the last of the series, so that irrespective of what pulse is next sent out by the reader mechanism and circuits, there will be no circuit for such pulse in the relay counter circuits, and therefore the simultaneous auxiliary pulse which accompanies each and every pulse will actuate differential relay 121 and all the holding circuits will be broken by the opening of contacts 112. This clears out the system so to speak and puts the incoming circuits back in condition to receive the proper sequence of pulses again.

It now follows that so long as pulses corresponding to the character sequence of letters for which the system is wired are received, the counters will be actuated in turn. However, if any character representing pulse other than the specific characters for which the circuit is set up is received, no pulse will be transmitted to left-hand winding 124 of the differential relay. Therefore, the differential relay will be actuated because of the flow of the simultaneous auxiliary pulse received with each character pulse over the circuit connected to terminal T49 and which energizes winding 122 of the differential relay. Whenever differential relay 121 is actuated, it will open the holding circuit for all relays then being maintained in an energized condition and the whole system will be cleared out, so to speak, ready for further receipt of pulses representing the specific sequence.

It should be noted that in case a pulse representing the first letter of the given sequence, in this case the letter "A," is repeated, it will find its circuit open at the contacts 95 and 126 of relay 104 and therefore differential relay 121 will be actuated. However, duration of pulses as produced in this system is sufficient that upon clearing of the holding circuit and returning of relay 104 to its reactivated state, the pulse representing letter "A" will be continuing and may then cause actuation of counter 102 in the manner previously described.

After a complete sequence of characters has been received by this system, there will be no circuit closed to any of the terminals T1 through T46. Therefore, whatever character representing pulse follows, it will inevitably cause actuation of differential relay 121 which will open the holding circuit and clear out the relay system preparing it for further actuation.

A specific embodiment of the present invention has been described, but is not to be considered as limiting in any way the scope of this invention, for such scope reference is made to the appended claims.

I claim:

1. In apparatus for determining the frequency of occurrence of a selected character sequence combination in a particular text source, the combination of means providing a plurality of circuit paths for receiving electrical pulses representing the different characters composing said text source, there being a separate circuit path for each character-representing pulse; cyclically operable means providing for transmitting character-representing electrical pulses to said circuit paths in a sequential order which is the same as that in which the characters appear in said text source, there being one character pulse provided for in an operating cycle; a plurality of normally deactivated electrically responsive indicating units corresponding, respectively, to the characters composing the selected sequence combination and each such unit being activated upon receiving a character-representing electrical pulse; each said indicating unit having a pulse receiving circuit connection with the circuit path which receives the character pulse to which such unit corresponds; the pulse receiving circuit connection for the indicating unit corresponding to the first character of the selected sequence, being closed when such unit is in its deactivated condition and being opened by the activation of said unit; the pulse circuit connection for each indicating unit corresponding to a character of the sequence after the first, being open when the unit corresponding to the preceding character of the sequence is in deactivated condition and being closed by the activation of the last-named unit; means for maintaining each indicating unit in an activated condition when such unit receives a character-representing pulse corresponding thereto; means for deactivating all indicating units when a character-representing pulse is provided which is not that of the next character in said selected character sequence; said last named means causing deactivation of all indicating units upon receipt of the next character-representing pulse after the last character in said selected character sequence.

2. In apparatus for determining the frequency of occurrence of a selected character sequence combination in a particular text source, the combination of means providing a plurality of circuit paths for receiving electrical pulses representing the different characters composing said text source, there being a separate circuit path for each character-representing pulse; cyclically operable means providing for transmitting character-representing electrical pulses to said circuit paths in a sequential order which is the same as that in which the characters appear in said text source, there being one character pulse provided for in an operating cycle; a plurality of normally deactivated electrically responsive indicating units corresponding, respectively, to the characters composing the selected sequence combination and each such unit being activated upon receiving a character-representing electrical pulse; each said indicating unit having a pulse receiving circuit connection with the circuit path which receives the character pulse to which such unit corresponds; the pulse circuit connection for the indicating unit corresponding to the first character of the selected sequence, being closed when such unit is in its deactivated condition and being opened by the activation of said unit; the pulse circuit connection for an indicating unit corresponding to a character of the sequence after the first, being open when the unit corresponding to the preceding character of the sequence is in deactivated condition and being closed by the activation of the last-named unit; means for maintaining each indicating unit in an activated condition when such unit receives a character-representing pulse corresponding thereto; means for deactivating all activated indicating units upon a failure of the indicating unit corresponding to the next character of the selected sequence to receive a character-representing pulse; means responsive to the activation of the unit corresponding to the last character of the sequence for indicating such fact; said means for deactivating all activated indicating units being operable after the activation of the indicating unit corresponding to the last character of the selected sequence for deactivating all units and thereby restoring the indicating unit corresponding to the first character of the sequence to a condition for receiving a pulse representing such first character.

3. A relay circuit for use in conjunction with a typewriter or the like to determine occurrences of specific combinations of characters comprising separate circuit means corresponding to each character, cyclic means for producing a concurrent pair of pulses during each cycle, one of which corresponds to the printing of each character, circuit means for energizing a first relay upon occurrence of the pulse representing a given character, a second relay, circuit means for causing said second relay to operate upon cessation of said given character-representing pulse and for holding both said first and second relays operated, a differential relay having contacts in said holding circuit, and circuit means for applying a pair of said concurrent pulses in an equal and opposite manner to said differential relay when predetermined characters occur in a specific predetermined sequence, only one of which concurrent pulses will be applied in the absence of such occurrence.

4. A relay circuit for use in conjunction with a typewriter or the like to determine occurrences of specific combinations of characters comprising separate circuit means corresponding to each character, cyclic means for producing a concurrent pair of pulses during each cycle one of which corresponds to the printing of each character, circuit means for energizing a first relay upon occurrence of the pulse representing a given character, a second relay, circuit means for causing said second relay to operate upon cessation of said given character-representing pulse and for holding both said first and second relays operated, circuit means for energizing a third relay upon occurrence of a pulse representing a second predetermined character following in immediate succession after said given character-representing pulse, said last named circuit means including contacts of said second relay, indicating means actuated by said third relay for giving an indication of the occurrence of said second predetermined character following said given character, a fourth relay, circuit means for causing said fourth relay to operate upon cessation of said second character-representing pulse and for holding said third and fourth relays operated, a differential relay having contacts in said holding circuits, and circuit means for applying both of said pair of concurrent pulses in an equal and opposite manner to said differential relay when predetermined characters occur in a specific predetermined sequence, only one of which pulses will be applied in the absence of such occurrence.

5. In apparatus for determining occurrences of a selected character sequence combination in a particular text the combination of an electric power source, a circuit representing each different character used in said text, connections for joining a plurality of relay indicator units to specific character-representing circuits, cyclically operable means for energizing one character-representing circuit and a common circuit with a pair of simultaneous pulses during each cycle, circuit means for energizing each of said relay indicator units in the selected sequence, a differential relay, circuit means including said relay indicator units for applying both said pulses in opposition to said differential relay when the selected sequence of character-representing circuits are energized in order, means for indicating each time one of said relay indicator units is energized, and circuit means controlled by said differential relay for deenergizing all said relay indicator units whenever the selected sequence of character-representing circuits are not energized in order.

6. A relay circuit for use in conjunction with a typewriter or the like to determine occurrences of specific combinations of characters comprising separate circuit means corresponding to each character, cyclic means for producing a concurrent pair of pulses during each cycle, one of which corresponds to the printing of each character, circuit means for energizing a first relay upon occurrence of the pulse representing a given character, indicating means actuated by said relay to indicate occurrence of the given character, a second relay, circuit means for causing said second relay to operate upon cessation of said given character-representing pulse and for holding both said first and second relays operated, a differential relay having contacts in said holding circuit, and circuit means for applying a pair of said concurrent pulses in an equal and opposite manner to said differential relay when predetermined characters occur in a specific predetermined sequence, only one of which pulses will be applied in the absence of such sequential occurrence.

7. A relay circuit for use in conjunction with a typewriter or the like to determine occurrences of specific combinations of characters comprising separate circuit means corresponding to each character, cyclic means for producing a concurrent pair of pulses during each cycle one of which corresponds to the printing of each character, circuit means for energizing a first relay upon occurrence of the pulse representing a given character, a second relay, circuit means for causing said second relay to operate upon cessation of said given character-representing pulse and for holding both said first and second relays operated, circuit means for energizing a third relay upon occurrence of the pulse representing a second predetermined character, said circuit means including contacts of said second relay, indicating means actuated by said third relay for giving an indication of the occurrence of said second predetermined character, a fourth relay, circuit means for causing said fourth relay to operate upon cessation of said second pulse and for holding said third and fourth relays operated, circuit means for energizing a fifth relay upon occurrence of the pulse representing a third predetermined character, said circuit means including contacts of said fourth relay, indicating means actuated by said fifth relay for giving an indication of the occurrence or said third predetermined character, a sixth relay, circuit means for causing said sixth relay to operate upon cessation of said third pulse and for holding said fifth and sixth relays operated, a differential relay having contacts in said holding circuits, and circuit means for applying both of said concurrent pair of pulses in an equal and opposite manner to said differential relay when predetermined characters occur in a specific predetermined sequence, only one of which pulses will be applied in the absence of such occurrence.

References Cited in the file of this patent

UNITED STATES PATENTS

| Number | Name | Date |
|---|---|---|
| 2,414,472 | Loughridge | Jan. 21, 1947 |
| 2,461,451 | Tholstrup | Feb. 8, 1949 |
| 2,551,977 | Smith | May 8, 1951 |